United States Patent
Kulakowski

(10) Patent No.: US 7,962,947 B2
(45) Date of Patent: Jun. 14, 2011

(54) CONTENT DELIVERY PROXY SYSTEM AND METHOD

(75) Inventor: Robert T. Kulakowski, Rancho Santa Fe, CA (US)

(73) Assignee: Verimatrix, Inc., San Diego, CA (US)

( * ) Notice: Subject to any disclaimer, the term of this patent is extended or adjusted under 35 U.S.C. 154(b) by 476 days.

(21) Appl. No.: 12/250,846

(22) Filed: Oct. 14, 2008

(65) Prior Publication Data
US 2009/0100465 A1 Apr. 16, 2009

Related U.S. Application Data

(60) Provisional application No. 60/979,907, filed on Oct. 15, 2007.

(51) Int. Cl.
*H04N 7/173* (2006.01)

(52) U.S. Cl. ............ 725/110; 725/48; 725/51; 725/109; 725/133; 725/143

(58) Field of Classification Search .................. 725/48, 725/51, 109, 110, 133, 143, 62
See application file for complete search history.

(56) References Cited

U.S. PATENT DOCUMENTS

| | | | | |
|---|---|---|---|---|
| 5,996,022 A * | 11/1999 | Krueger et al. | ............... | 709/247 |
| 6,049,821 A * | 4/2000 | Theriault et al. | ............... | 709/203 |
| 6,826,608 B1 * | 11/2004 | Sheth et al. | .................... | 709/224 |
| 7,016,963 B1 | 3/2006 | Judd et al. | | |
| 7,103,906 B1 * | 9/2006 | Katz et al. | ....................... | 725/87 |
| 7,149,969 B1 | 12/2006 | Thrane | | |
| 7,177,949 B2 | 2/2007 | Bracewell et al. | | |
| 7,216,177 B1 | 5/2007 | Strong et al. | | |
| 7,281,060 B2 | 10/2007 | Hofmann et al. | | |
| 7,634,795 B2 * | 12/2009 | Dureau | ........................ | 725/80 |
| 2002/0083201 A1 * | 6/2002 | Iyengar et al. | ................ | 709/246 |
| 2002/0108121 A1 * | 8/2002 | Alao et al. | ..................... | 725/110 |
| 2004/0172484 A1 * | 9/2004 | Hafsteinsson et al. | ......... | 709/246 |
| 2006/0095945 A1 * | 5/2006 | Carpenter et al. | ............... | 725/87 |
| 2007/0022442 A1 * | 1/2007 | Gil et al. | ......................... | 725/62 |
| 2007/0050820 A1 * | 3/2007 | Saarikivi et al. | ................ | 725/62 |
| 2007/0079345 A1 * | 4/2007 | McEnroe | ...................... | 725/106 |

(Continued)

OTHER PUBLICATIONS

International Search Report and Written Opinion from PCT/US2008/079793 dated Apr. 28, 2009.

*Primary Examiner* — Christopher Kelley
*Assistant Examiner* — Timothy R Newlin
(74) *Attorney, Agent, or Firm* — Procopio, Cory, Hargreaves & Savitch LLP

(57) ABSTRACT

A content delivery proxy system and method delivers content to an unsupported client device within a content delivery system by converting messages and data from the unsupported client device into content delivery system supported messages and data. Client log-in messages received from the unsupported client device are converted into a content delivery system supported format and sent to the content delivery system, and user entitlement information of a user of the unsupported client device is requested from the content delivery system. If the user is a subscriber of the content provider, an unsupported client device identifier is created for the client device. A user interface for selecting content from the content delivery system is displayed on the client device in a client device supported format, and selections on the user interface are sent to the content delivery system. Selected content is provided to the client device in the proper format for playback on the client device.

44 Claims, 4 Drawing Sheets

U.S. PATENT DOCUMENTS

2007/0081519 A1* 4/2007 Ramaswamy et al. ........ 370/352
2007/0283048 A1* 12/2007 Theimer et al. ............... 709/246
2008/0134277 A1* 6/2008 Tucker .......................... 725/133
2008/0276279 A1* 11/2008 Gossweiler et al. ............ 725/46
2009/0113489 A1* 4/2009 O'Neil ............................ 725/62

* cited by examiner

CONTENT DELIVERY PROXY SYSTEM AND METHOD

RELATED APPLICATION

The present application claims the benefit of co-pending U.S. provisional patent application No. 60/979,907 filed Oct. 15, 2007, which is incorporated herein by reference in its entirety.

BACKGROUND

1. Field of the Invention

The present invention relates generally to content delivery or middleware systems which couple user devices such as set top boxes (STBs) to content providers such as IPTV (internet protocol television), cable network operators, satellite television providers or VOD (video on demand) providers, and is particularly concerned with an interface or proxy for an existing content delivery system or middleware system. The present invention can be used in other systems where subscriber management is involved including music download and streaming services, game services, document services and other services where there is a need to couple disparate unsupported client devices to a service.

2. Introduction

In content delivery systems which deliver entertainment media and the like to client devices, service and network software provides subscriber management, electronic program guide (EPG), client login, client firmware download and client provisioning, broadcast TV, and Video On Demand (VOD) services. In some systems, this software is provided by so-called "middleware". Most internet protocol television (IPTV) systems support a limited number of device types and require a client device application that supports the system middleware. The client device application is often called a client middleware. In most cases, client middlewares are not easily ported to other devices without major software development efforts. In addition, most closed network video and content delivery systems cannot deliver content securely to devices outside the closed network because of security issues in addition to middleware compatibility issues.

Current IPTV and VOD middleware systems typically provide for programs to be viewed on STBs and do not support PC (personal computer) type devices such as computers, mobile phones, personal digital assistants, and the like. Typically, current middleware for live television and video on demand is provided over a network such as a telephone company (Telco) network or satellite TV provider or cable TV provider, and allows viewing of electronic program guide (EPG) listings and of the programs themselves in a format suitable for a television screen. Such content cannot be viewed on other, PC based devices such as personal computers, laptop computers, or mobile phones, personal digital assistants, personal media players, and the like because the middleware system does not support such devices.

Therefore, what is needed is a system and method that overcomes these significant problems found in the conventional systems as described above.

SUMMARY

A content delivery or middleware proxy system in one embodiment provides PC client to system translation functions allowing network systems that support only certain types of clients to also support PC or other unsupported client devices, without any major changes to an existing content delivery system or middleware of a content provider. The system and method is designed to make any client device look like a standard or middleware supported client device. The proxy system may also support multiple Digital Rights Management (DRM) systems without requiring changes to the existing middleware system or the client device. The proxy system may be used with an IPTV network content delivery or middleware system in one embodiment, but can also be applied to cable, satellite, broadcast TV, broadband internet, and any other network or data delivery system.

In one embodiment, a content delivery or middleware proxy system has a client log-in translation module and an electronic program guide (EPG) translation module which convert between the client device language and the existing content delivery or middleware system language to permit an unsupported client device to log on to a network or data delivery system and to receive the EPG in a format they can understand. A VOD/live TV signal interface module transmits the VOD or broadcast signals from the network provider in a video format viewable on the client device. In one embodiment, the middleware proxy system allows for additional channels which are viewable on mobile phones, personal computers, and other PC-based client devices, and these are added to the available programs which the existing middleware system lists on the EPG without the existing middleware needing to be aware that they are not standard or existing middleware supported STB channels.

The content delivery or middleware proxy system connects unsupported client devices to a content delivery system or middleware system without requiring changes to the content delivery system system, so that operators may add support for client devices without modifications to the client or the system middleware. In addition, the content delivery proxy system may be adapted to allow support of client devices containing multiple Digital Rights Management (DRM) formats that are not supported by the content delivery system or middleware. In this system, translation between multiple different native languages, such as JAVA, HyperText Markup Language (HTML), and others, may be provided in a single unit, as well as support for multiple different DRM systems, without requiring each new client device to be modified in order to communicate via a network such as a telephone company (Telco) network with a content provider through existing content provider middleware which may be configured for supporting only one specific type of client device, and without modification of the existing content provider middleware or content delivery system to support the new client device.

According to another aspect, a method of delivering content to an unsupported client device within a content delivery system is provided. In the method of one embodiment, log in information from an unsupported client device is translated from the client device message format to the content delivery system message format and is then transmitted to the content delivery system, a user interface provided by the content delivery system is translated from the content delivery system supported format to a client device supported format and then displayed on the client device, client content selections on the user interface are translated from the client device format to the content delivery system format and provided to the content delivery system, and selected content is provided to the client device in the proper format for playback on the client device. While the term 'translate' was used in the above explanation other methods can be used instead of translation including have a protocol adapter to adapt a client based message and display format to a content delivery system format, or to have a client based application output system format messages, or a parallel graphical user interface (GUI) different than the content delivery system supported GUI, or a parallel processing element to the processing performed by the content delivery system or middleware system.

In one embodiment, the user interface may be an electronic program guide (EPG) or the like which displays available channels and VOD selections. In one embodiment, where the existing content delivery system only supports STBs in JAVA programming language format, for example, and the client device is PC based, the content delivery proxy system is designed for translation of messages, message data, middleware system data, or middleware protocol between the client device and the existing middleware or content delivery system, and may translate back and forth between JAVA and HyperText Markup Language (HTML), for example. Other such message or data translations or data format support appropriate for adapting a client device that is not supported by the content delivery system is also envisioned, including translations including interfacing to binary, extended (XML) markup language, Java, abstract syntax notation one (ASN.1), C/C++ and other data formats. The translations may include translation between different versions or forms of JAVA, binary, or other languages. Data conversions or data translations, protocol conversions or translations, message conversions or translations, and other translations or conversions may be applied as necessary to couple a content delivery system or middleware system to a client device not normally supported by the content delivery system.

In this system, the system middleware or service and network software does not have to know the device type of the client device and there is no need for additional native middleware support on the client device to interface to the operator's headend system. Since the middleware proxy system translates between the middleware system and the client device so that the client device looks like a set top box or middleware supported client device to the existing middleware system, the client device operates or appears to the headend system as a device with native support.

The content delivery or middleware proxy system and method in one embodiment allows support for different types of client devices having multiple digital rights management (DRM) formats without requiring changes to the existing system middleware designed for STB DRM formats or support for systems without DRMs as well. For example, open mobile alliance (OMA) DRM support can be added to a middleware system without the middleware vendor making any system software changes on the headend and without having a middleware client for the target device. The system provides any client with existing network system middleware translation functions, such as existing IPTV system middleware, allowing IPTV systems that previously did not support PC or other types of clients to support PC clients. In fact, the IPTV system does not know that the client device is a PC because the system operation looks exactly the same as a STB operation or middleware supported client to the IPTV middleware headend.

The content delivery proxy system and method couples a client device or client device DRM to a middleware system that may not have native support for the client device and allows the unsupported client device to use the services of the operator with appropriate provisioning of the adapted client device. Unlike prior art VOD and IPTV middleware systems, this system supports any type of content such as video, audio, computer program, game and other forms of digital data. In one embodiment, a distributor can distribute content to devices over the open Internet and off the content distributors network with billing, accounting, client provisioning, and client security acceptable to movie studios, broadcasters and other content providers.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
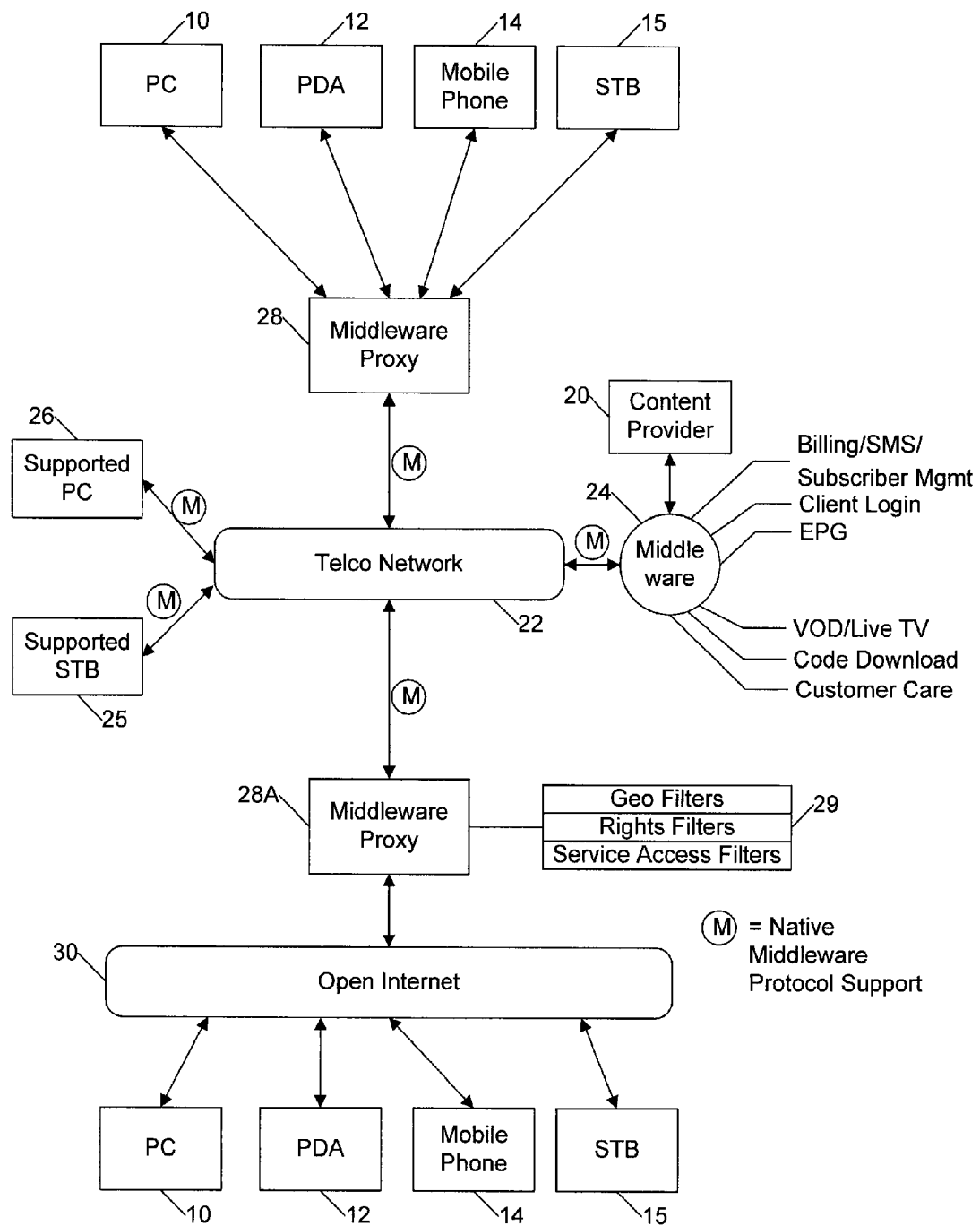
FIG. 1 is a block diagram of one embodiment of a content delivery system architecture for coupling various client devices to a content provider.

Certain embodiments as disclosed herein provide a content delivery or middleware proxy system and method for delivering content to different types of unsupported client devices within a content delivery system without requiring existing "middleware" or content and delivery software to run on the client device. For example, one method as disclosed herein allows for delivery of content to a personal computer (PC) based client device through existing internet protocol television (IPTV) middleware which only supports set top box (STB) client devices, using a middleware proxy system to translate between the client device messaging protocol and the IPTV middleware messaging protocol. Although the embodiment below describes a proxy system used in conjunction with IPTV system middleware, the system and method described is not limited to IPTV networks, and may be applied to cable, satellite, broadcast TV, broadband internet, and any other network or data delivery system in alternative embodiments. The use of the term PC in this patent application refers not only to a Personal Computer but also any other type of client device such as a cellular telephone, Personal Digital Assistant (PDA), portable media player, game player, unsupported STBs, and other computer type devices.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

In the following description, a client device may be any type of device capable of computing and receiving data from a network, such as a set top box (STB), personal computer, game console, cellular or mobile phone, personal digital assistant (PDA), personal media player, video equipment such as a digital video receiver (DVR), digital video disc (DVD) player (DVD), compact disc (CD) player, smart card, or the like.

A network may refer to a network or combination of networks spanning any geographical area, such as a local area network, wide area network, regional network, national network, and/or global network. The Internet is an example of a current global computer network. Those terms may refer to hardwire networks, wireless networks, or a combination of hardwire and wireless networks. Hardwire networks may include, for example, fiber optic lines, cable lines, ISDN lines, copper lines, etc. Wireless networks may include, for example, cellular systems, personal communications service (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others.

Also in the following description, digital content provided to a client device may be a movie or television show, but may alternatively or additionally be a music recording or other type of digital content file in alternative embodiments, such as music, games, software, multi-media presentations, images, and other materials that can be represented digitally. A digital content provider may be the creator of the digital content, such as a movie or motion picture studio or television studio, or may be a content provider which distributes content created by others, such as a home box office or video on demand provider, IPTV provider, cable TV provider, satellite content provider, broadcast TV provider, broadband internet provider, international distributor, amateur content provider, or any other network or data delivery system. In the illustrated embodiment, digital content is supplied through a telephone company network, but the network which couples the digital content provider to the client device may alternatively be a network of a cable television provider, satellite television provider, Internet service provider, or the like.

Although the proxy system is described below as a middleware proxy system, this language should be considered to include a content delivery proxy system or middleware proxy system for use in conjunction with any content delivery system which delivers content to supported client devices.

As illustrated in FIG. 1, different types of unsupported client devices which have different native messaging or data structures and different DRM formats, such as a personal computer 10, a personal digital assistant 12, a mobile phone 14, and a set top box or STB 15, receive content from a content delivery system comprising a content provider 20 such as an IPTV provider and associated middleware 24 through a network 22 such as a telephone company (Telco) or other distribution network. In this embodiment, the content provider 20 has an existing middleware or content delivery system 24 which only supports certain client devices, such as supported set top boxes 25 and, in some cases, limited types of PC device 26. Middleware system 24 is connected to the client devices 10, 12, 14, and 15 through a content delivery proxy system or middleware proxy system 28 which adapts any unsupported client devices to the middleware system 24 without requiring changes to the existing middleware or content delivery system 24, as described in more detail below with reference to FIGS. 2 to 4. Content delivery system 24 may be integrated in the content provider 20 in some system architectures, or may be a separate middleware platform. The middleware proxy system 28 may be one or more servers running on the Telco network, as illustrated, and may be provided in a single housing or unit for easy installation. In an alternative embodiment, the proxy system may be provided on a client device running on an open network wherein the proxy system running locally on the client performs the appropriate translations necessary to couple the client device not normally supported by the middleware system to the middleware system. In this case the proxy running on the client device may use screen resolution and message data not normally supported by the client device and couples the middleware supported resolutions and data to ones supported by the client.

FIG. 1 also illustrates a modified middleware proxy system 28A which allows similar, unsupported client devices 10, 12, 14, and 15 to receive content from the content provider 20 over the open Internet 30. The middleware proxy system 28A is similar to the system 28 but additionally includes software filters 29 such as geo filters which may include restrictions on geographical locations to which content may be distributed, rights filters which may restrict the types of client device to which content may be distributed, and service access filters which may restrict the type of service which is allowed over the open Internet. In FIG. 1, the client devices 10, 12, 14, and 15 linked to the content provider through middleware proxy system 28 or 28A are client device models which are unsupported by the existing content provider middleware 22, while the client devices 25 and 26 are models which are supported by middleware 22.

The main functions provided by the middleware proxy system 28 and 28A are as follows:
1. Client Login and Authentication.
2. Middleware interface for VOD purchase or Broadcast entitlement checking.
3. Electronic Program Guide or On Screen Display and User Interface for PC.
4. VOD purchase and Broadcast network signaling or network service control (for example performing a middleware system format appropriate multicast join, controlling a VOD movie stream, controlling the download of content, performing personal video recorder or PVR functions, firmware download, system and network client management, and provisioning services and the like)
5. Subscriber account activation and account services.

Figure 2:
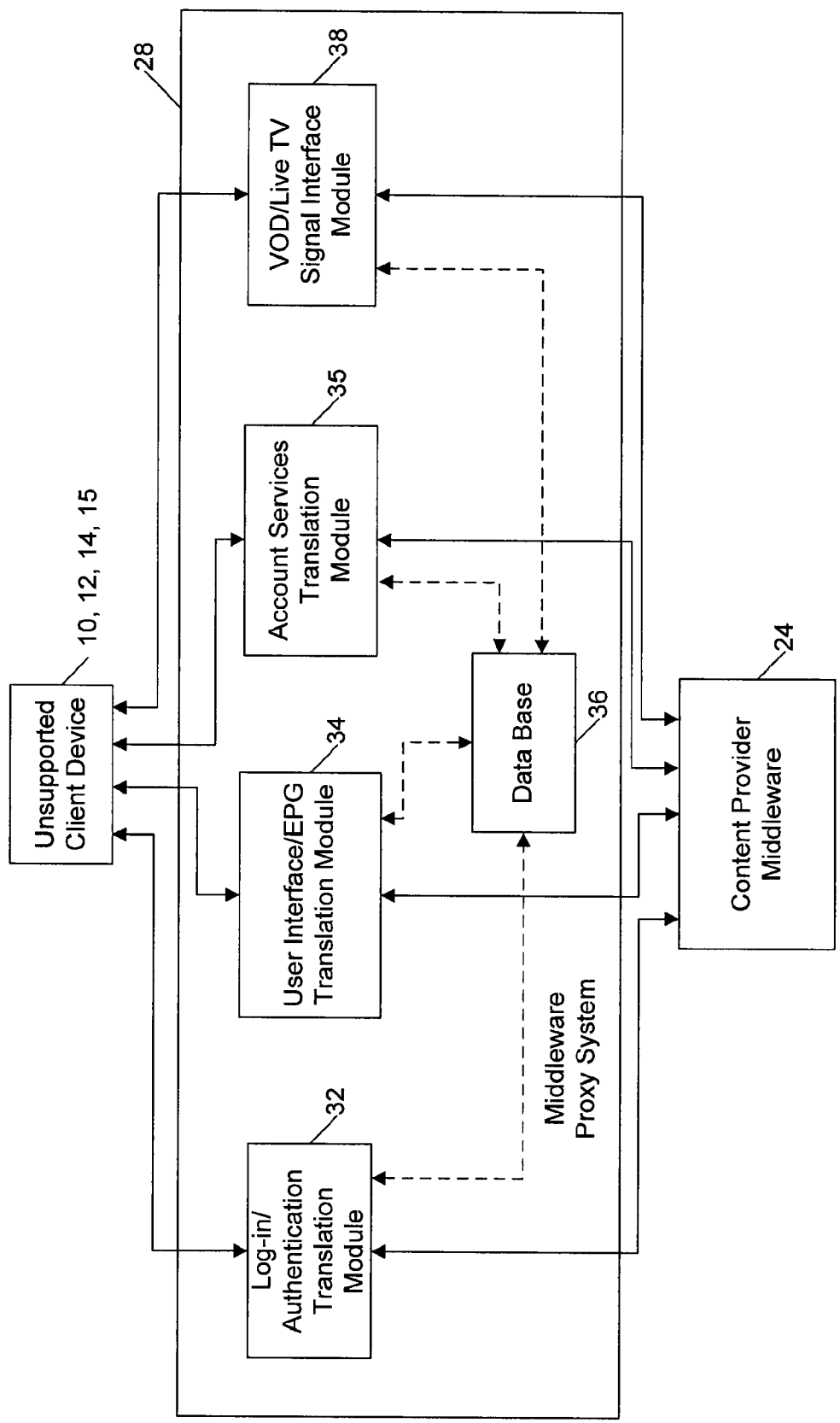
FIG. 2 is a block diagram of one embodiment of the content delivery or middleware proxy system of FIG. 1 for use when content is delivered through a private network.
Figure 3:
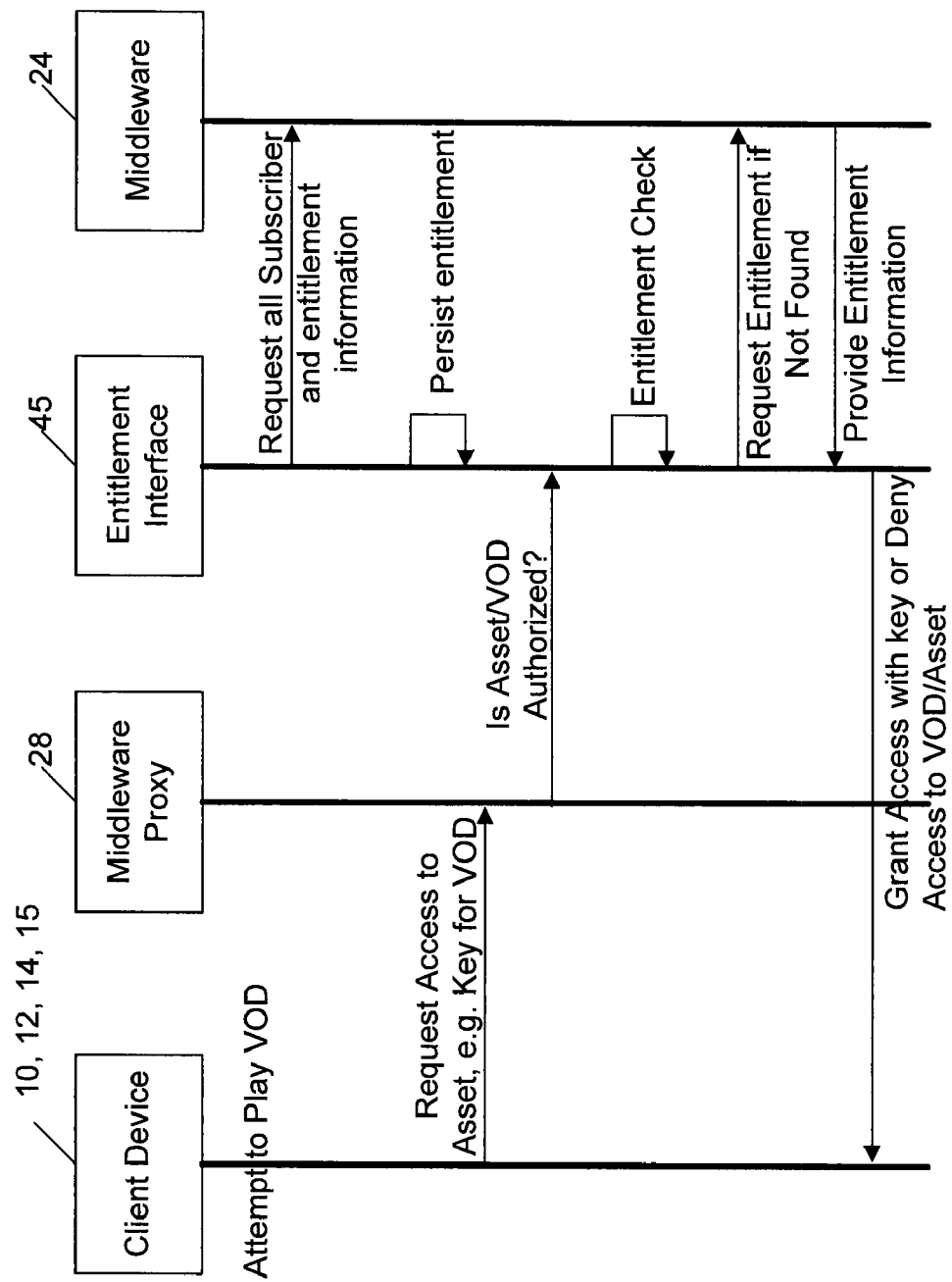
FIG. 3 is a block diagram illustrating an entitlement checking procedure.

FIG. 2 is a block diagram illustrating functional modules of the middleware proxy system 28 or 28A. The middleware proxy system 28A which provides content over the open Internet includes the modules of FIG. 2 and also includes the appropriate software filters (geographic, rights, and service access) for such content, as discussed above and indicated in FIG. 1. The main functions provided by the middleware proxy system are translation modules which allow translation back and forth between the native middleware messaging protocol or format and the client device messaging protocol or format for client login and authentication (module 32), user interface or electronic program guide (module 34), and client or subscriber account service functions (module 35) such as customer care or management, billing, and the like. An optional data base 36 may be linked to these modules in addition to a VOD/live TV signal interface module 38, or other support modules (not shown) for supporting PVR, firmware download, system and network client management, provisioning services and the like. An interface module is also provided for entitlement checking, as illustrated in FIG. 3 and described in more detail below.

While FIG. 2 shows multiple functional blocks, the proxy system can operate with as little as one of these functional blocks. For example, coupling of an unsupported client device to a middleware system may only require a Log-in/Authentication Translation Module 32. Other applications of this system may require one or more of the modules shown in FIG. 2 and these modules can be distributed running on different computers running on one or more networks (Ethernet, or Ethernet and mobile, or mobile, etc.) Although not illustrated in FIG. 2, the middleware proxy system or server has a first communication device which communicates with the existing middleware and a second communication device which communicates with the unsupported client devices.

In the middleware proxy system of this embodiment, client login and authentication for an unsupported client device, i.e. a client device which is not supported by the existing content provider middleware 24, uses the same content provider middleware provisioning interfaces as a supported client device, such as a supported STB 25 as illustrated in FIG. 1. This allows an IPTV Middleware system that only supports certain types of STB client devices to support PC based client devices such as PCs, mobile phones, PDAs, and the like, and other client devices such as unsupported types of STB, without modifications to the existing middleware system. To the IPTV middleware, any unsupported client device connecting through the middleware proxy system or server 28 or 28A looks like a supported client device, such as an STB client device. The middleware proxy system can therefore extend an IPTV system to support any client device (or even a different legacy STB middleware) to an IPTV middleware that does not provide native support for the client device. In one embodiment, the PC Client Login and Authentication protocol uses standard or middleware supported STB Client Login and Authentication protocol which may include clone detection as described in co-pending application Ser. No. 11/625,045 filed on Jan. 19, 2007, the contents of which are incorporated herein by reference. The log in and authentication module 32 of FIG. 2 translates the client login and authentication function to that required by the IPTV middleware 24.

Figure 4:
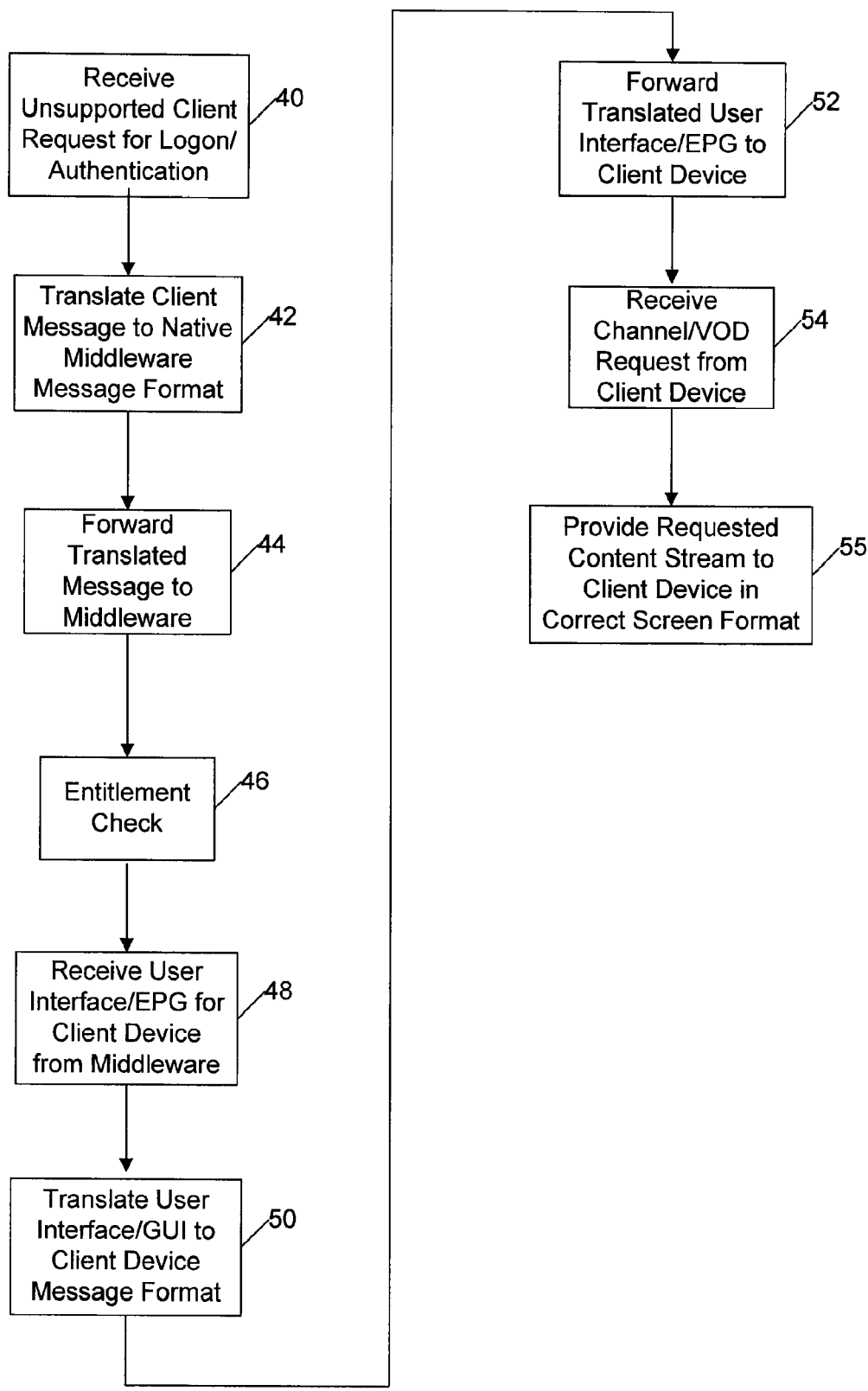
FIG. 4 is a flow diagram illustrating an embodiment of a method of delivering content to an unsupported client device using the content delivery proxy system of FIG. 2.

FIG. 4 is a flow diagram illustrating one example of a method of providing content to an unsupported client device in the system of FIGS. 1 and 2. In one example, where the client device is a PC based device using HTML protocol and the native middleware protocol uses JAVA, the client log in request message 40 is received in HTML format and is translated by module 32 to JAVA format with appropriate data conversion at step 42 before being sent to the existing middleware client log in module (step 44). Messages back and forth between the client device and middleware system 24 are translated from HTML to JAVA and from JAVA to HTML as needed in the translation module 32. It should be understood that the same procedure is used regardless of the native language of the client device and the middleware 22, and the log-in and authentication module may be programmed for translation between standard languages other than JAVA and HTML depending on the type of client device to which service is to be provided. In some systems translations may not be required in one or more of the modules shown, or translations between the same language such as between two JAVA interfaces or two C/C++ interfaces.

In one embodiment, a standard entitlement interface 45 is used to interface to the IPTV middleware 24 for VOD purchase or broadcast entitlement checking, as generally illustrated in FIG. 3. In one example, an entitlement interface as provided in the Content Security Manager system available from Verimatrix, Inc. of San Diego, Calif. may be provided in the middleware proxy system 28 or connected to the middleware proxy system as indicated in FIG. 3. The middleware proxy system server obtains none, some or all of the business rules and subscriber entitlements for disparate client devices over the entitlement interface 45. In this way, any IPTV middleware may be extended to support additional devices and services without needing a new IPTV headend system middleware.

In step 46, the proxy system 28 determines the subscriber rights associated with the client device using the subscriber ID or identification number or translated client ID for the client device. One example of an entitlement check procedure is generally illustrated in FIG. 3. Existing middleware systems normally provide service to STBs based on the Media Access Control (MAC) address or connection ID associated with the specific STB, or a subscriber ID or translated subscriber ID, and the subscriber entitlement information is associated with unique MAC addresses or device serial number of client ID or other identifier. When a new subscriber having an unsupported client device, such as a mobile phone, for example, wishes to sign up for IPTV broadcast or video on demand (VOD) service, the mobile phone number is associated with a proxy or fake MAC address and the proxy MAC address is provided to the existing middleware system 24. This may be done when the prospective subscriber calls an 800 number of the IPTV provider to sign up for service. The actual connection ID of the unsupported client device may be stored along with the proxy MAC address in the middleware proxy data base 36. The actual connection ID is the phone number of the device in the case of a mobile phone or PDA. For other types of unsupported client devices, a client unique identifier is managed by the proxy system translating an unsupported client unique ID to a middleware support ID, and an example includes using a client unique ID and mapping it to look like a MAC address.

Once the log on and authentication procedure is completed and the entitlement rights of the subscriber have been checked, the appropriate broadcast and/or VOD keys are delivered to the client device and the proxy STB ID for the client device is provided to the middleware system 24. The middleware system creates a graphical user interface (GUI) comprising an Electronic Program Guide (EPG) or On Screen Display and User Interface for that client, indicating available channels and videos which may be selected. This EPG is in the standard language for client devices supported by the middleware system 24, typically STBs, and may be in JAVA, for example. It is also in an STB screen format. For video (or other services) the channels and videos available are dependent on the type of client devices supported by the operator and include channels and videos provided by the content provider 20 in the proper format for display on the screen of the client device, such as mobile phone video display format, STBs, PDA, gaming consoles, portable media players or PC display format. The middleware system 24 is not aware that these channels and videos are anything other than standard, middleware supported STB channels and videos.

In one embodiment, data not normally associated with a standard subscriber ID is used to indicate to the system operator that the subscriber STB information is actually for a middleware unsupported device. This can be achieved by having non-supported client system middleware data that is obviously different from a standard client device supported by middleware. For example, all client IDs for mobile devices can begin with the letter 'M' when the system middleware supports an alphabetic character in the client ID fields, and other system middleware compatible identifiers can be created so that the operator can immediately identify a non-supported client by a system middleware data field. Another example is to have all non-supported client devices start with a client ID of 90xxx where a client id prefix of 910xxx indicates a mobile client, 992xxx a PDA, 993xxx a PC and middleware supported devices have IDs from 000xxx to 899xxx such as 8993425721.

The middleware proxy system 28 receives the EPG in supported client language from the middleware system 24 at step 48, and the EPG is translated from the supported client/existing middleware language or message format into the unsupported client device message format by EPG translation module 34 (step 50). The proxy STB connection ID for the client device is changed to the actual connection ID such as the mobile phone number for the client device, and the translated EPG is then forwarded to the client device (step 52). The translated EPG is in a format and size suitable for display on the screen of the client device. The translation step 50 may comprise translation from JAVA to HTML, for example, or may comprise translation between other languages or data format or message format. HTML pages may be used to generate PC client browser EPG screens and browser based VOD purchase options. In this step, existing IPTV middleware metadata is used to create a VOD or Broadcast TV EPG, automatically generating EPG data without any modifications to the IPTV Middleware. This step may be performed using various web development tool languages such as Ruby On Rails, Hypertext Preprocessor (PHP), Pearl or other web development tool languages. Additional Hyper Text Transfer Protocol (HTTP) servers may be deployed by the Telco network for serving the HTTP EPG data for VOD and broadcast TV. The EPG gives the user options for purchasing additional channels or purchasing selected videos.

In one embodiment, EPG data and other data can also be prepared for a client device not supported by the middleware system outside of proxy to avoid CPU overhead of on-the-fly translation and as such unsupported clients can obtain EPG from an EPG server that is not the supported STB only system middleware EPG server. In this embodiment, any of the translations functions, message protocol conversion functions or other modules or functions as described above can also be statically prepared and delivered to the non-supported client without on-the fly translation. Non-supported client data and system middleware data can use any type of data format, data type, programming language, the system described above is not limited to certain types of data or protocols. Network control command message translation or generation or deletion is performed to control video download or video play out. For example, a conversion from real time streaming protocol (RTSP) to a non-RTSP protocol may be necessary or the client device may not support an IP Multimedia Subsystem (IMS) layer control signal that is required to start a video or start or control a broadcast TV channel and this may be performed by the proxy service in the VOD/Live TV Signal Interface Module 38 in FIG. 2. Other application (music, video, game, document) service specific signaling may be incorporated to perform control plane signal functions and translations when required.

A broadcast channel or VOD request received from the client device (step 54) using the EPG is translated from the client device language to the middleware language (e.g. HTML to JAVA) at module 34, and then forwarded to the middleware 24. The requested content stream (VOD or broadcast channel) is started at the content provider headend and sent to the middleware proxy in association with the proxy connection ID such as a proxy STB ID, or directly to the client without the stream going through the proxy client. The middleware proxy system translates the proxy connection ID into the proper connection ID for the client device, and the requested content is forwarded to the client device (step 55) by VOD/live TV signal interface module 38. In some systems the VOD/live TV signal interface module 38 may not be needed and client devices not supported by the system middleware may in fact be supported at the VOD or broadcast TV signal control layer when protocols such as RTP/RTSP streaming or Multicast Joins are required by the network to control video streams. In some cases only address translations or address format translations maybe required and not stream control protocols, and in other cases data format conversions and stream control protocol translations are required to support a client device not normally supported by the system middleware. The requested content is in the correct screen format for the requesting client device since only channels and videos in that screen format are listed on the EPG created for that client device.

The modules and processing shown in FIG. 2 and in other Figures of this patent application can be performed at any point in the system including on the middleware server, in network equipment, on a separate proxy system or even in the client device not supported by the system middleware.

The middleware proxy system 28 also provides secure subscriber signup support and subscriber customer care functions such as billing review and account cancellation via account service translation module 35, with all the standard account service or customer care functions being provided by the existing middleware system 24 and translated by module 35 for customer care interactions with the unsupported client device.

The procedure for client devices 10, 12, 14 or 15 requesting content over the open Internet 30 through middleware proxy system 28A is substantially the same as described above. However, in this case, appropriate geo filters, rights files, and service access filters determine whether service over the Internet is permitted.

In this system, the existing middleware system 24 does not have to be modified to handle multiple different types of client device, since each new client device looks like a standard, middleware supported STB client device to the existing middleware. To a Telco or other network, it appears as if the IPTV middleware they purchased has been extended to support multiple client device types (and maybe networks) without purchasing a new system and without modification to their existing system.

In video delivery systems content is king, and the availability of content on different subscriber devices can be a key business differentiator for an IP based network when compared to satellite and cable systems. When an operator can deliver their content to different types of client devices such as Set Top Boxes, Mobile Phones, PCs, and PDAs, the perceived value of the service increases. The middleware proxy system described above can also provide content on different client devices without requiring changes to the existing Operational and Business Support (OSS/BSS) system, and can be adapted supply content to devices not supported by the OSS/BSS system. When the proxy system described above is used in systems where it is desired to support devices not supported by the OSS/BSS, then the proxy system is utilized to map non-supported client devices to a format understood by the OSS/BSS using similar steps as applied for adapting the non-supported client to a middleware system.

The above approach to cross-platform content distribution is different from the techniques being proposed by Coral, Microsoft, and others. This approach offers a middleware proxy solution that transparently extends the services and capabilities associated with a user to device rights for devices running on unsupported by system middleware without native support for the unsupported device from the OSS/BSS system. Using the middleware proxy system, subscriber entitlements are extended into device entitlements, allowing an operator that does not have native support for mobile phones to add such support without changing the existing OSS/BSS system, for example. The technology used in the middleware proxy system may be used with security protocols, conditional access system technology and encryption based on many open standards such as Advanced Encryption Standard (AES), Secure Socket Layer (SSL) and public key infrastructure (PKI) based encryption, remote procedure call protocol encoded in Extensible Markup Language (XML), or XML RPC, Simple Object Access Protocol (SOAP), H.264 video compression standard, 3rd Generation Partnership Project (3GPP), Internet Engineering Task Force (IETF), Digital Video Broadcast (DVB) and other standards. The middleware proxy system may be used in conjunction with existing security certificate authority systems such as the Video Content Authority System (VCAS) provided by Verimatrix, Inc. of San Diego, Calif., producing a cross-platform CA system that extends the operators content distribution system with encrypted content using off-the-shelf standards based networking and head-end equipment and standards based security of Digital Rights Management systems.

Those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine and the processing can be performed on a single piece of hardware or distributed across multiple servers or running on multiple computers that are housed in a local area or dispersed across different geographic locations. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method of delivering content to an unsupported client device within a content delivery system, comprising:
receiving a client log in message from a client device at a content delivery proxy system, the client device comprising an unsupported client device which is not supported by a content delivery system of a content provider from which service is requested in the message;
converting the received client log in message into a content delivery system supported message format;
sending the converted message to the content delivery system and requesting the entitlement rights of a user from the content delivery system for the unsupported client device to receive content from the content provider;
creating an unsupported client identifier associated with the user if the user is found to be a subscriber in the content delivery system of the content provider, the unsupported client identifier associating the unsupported client device with the subscriber, whereby the unsupported client device appears to be a content delivery system supported client device to the content delivery system;
displaying a user interface for selecting content from the content delivery system on the unsupported client device in a message and display format which is supported by the client device;
receiving a content request entered at the user interface on the unsupported client device;
sending the user interface entered content request to the content delivery system; and
providing the requested content from the content delivery system to the client device in a client device display format for playback on the client device.

2. The method of claim 1, wherein the step of sending messages to the content delivery system includes modifying the unsupported client device identifier into a content delivery system supported client device identifier.

3. The method of claim 2, further comprising receiving a message from the content delivery system for the unsupported client device, the message being associated with the content delivery system supported client device identifier, converting the message into a message display format which is supported by the client device, and sending the converted message to the client device, the step of converting the message including modifying the content delivery system supported client device identifier into the unsupported client device identifier.

4. The method of claim 1, further comprising sending messages from the content delivery system to the unsupported client device in a message display format which is supported by the client device.

5. The method of claim 1, wherein the step of sending the user interface entered content request to the content delivery system includes converting the content request into a content delivery system message format.

6. The method of claim 1, wherein the step of converting the client log in message into the content delivery system message format comprises translating the message from a machine language used by the client device into a different machine language used by the content delivery system.

7. The method of claim 6, wherein the languages comprise two different languages selected from the group consisting of JAVA, Hypertext Markup Language (HTML), binary, extended mark up language (XML), Abstract Syntax Notation One (ASN.1), and C/C++.

8. The method of claim 1, wherein the step of converting a message received from the client device into a content delivery system supported format comprises conversion between two different versions of the same machine language.

9. The method of claim 8, wherein the step of converting comprises conversion between different forms of binary, JAVA, or C/C++.

10. The method of claim 1, wherein the step of converting a message received from the client device into a content delivery system supported format comprises using a protocol adapter to adapt a client device based message format to a content delivery system based message format.

11. The method of claim 1, further comprising conversion of messages between the content delivery system and unsupported client device between different digital rights management (DRM) formats.

12. The method of claim 1, wherein the user interface comprises an electronic program guide (EPG) of the content distributor converted from the existing content delivery system format into a format which can be displayed on the unsupported client device.

13. The method of claim 1, further comprising storing a plurality of different user interfaces of different content delivery systems in a format supported by the unsupported client device, and displaying the user interface of a selected content delivery system on the unsupported client device in the format supported by the client device on request by a user of the unsupported client device.

14. The method of claim 1, wherein the user interface is an electronic program guide (EPG).

15. The method of claim 1, wherein the user interface is a graphical user interface (GUI).

16. The method of claim 15, wherein the step of displaying a user interface comprises selecting a GUI which is in a message and display format supported by the client device from a series of parallel GUIs in different message and display formats and displaying the selected GUI on the client device.

17. The method of claim 1, wherein the content provided to the unsupported client device is selected from the group consisting of video content, audio content, games, software, documents, binary data, images, and multi-media content.

18. The method of claim 1, wherein the unsupported client device is selected from the group consisting of set top boxes (STBs), personal computers (PC), mobile phones, personal digital assistants, personal media players, and smart cards.

19. The method of claim 1, wherein the content provider is selected from the group consisting of motion picture studios, television studios, video on demand (VOD) providers, internet protocol TV (IPTV) providers, cable TV providers, satellite content providers, broadcast TV providers, broadband internet providers, international distributors, audio content providers, amateur content providers, game providers, and data delivery systems.

20. The method of claim 1, wherein the step of providing an unsupported client device identifier comprises assigning a unique proxy Media Access Control (MAC) address supported by the existing content delivery system to the unsupported client device, and creating a content delivery system supported client device identifier which includes the unique proxy MAC address.

21. The method of claim 20, further comprising associating a connection identifier (ID) for the unsupported client device with the proxy MAC address, and providing the proxy MAC address to the content delivery system.

22. The method of claim 1, further comprising requesting entitlement for the user of the unsupported client device if entitlement is not confirmed, receiving entitlement information from the content delivery system, and granting access by the unsupported client device to the requested content in a format compatible with the unsupported client device on receipt of the subscriber entitlement information from the content delivery system.

23. The method of claim 1, further comprising receiving client log in messages from at least two different client devices which are unsupported by the content delivery system, the client devices having different message formats, converting the received messages received from the client devices into a content delivery system supported message format, sending the converted messages to the content delivery system, displaying a user interface for selecting content from the content provider on each unsupported client device in a message and display format which is supported by the respective client device, receiving content requests entered at the user interfaces, sending user interface entered content requests to the content delivery system, and providing the requested content from the content delivery system to the respective client devices in a client device display format for playback on the respective client devices.

24. The method of claim 23, wherein the unsupported client devices are selected from the group consisting of set top boxes (STBs), personal computers (PC), mobile phones, personal digital assistants, personal media players, game players and smart cards.

25. The method of claim 24, wherein the unsupported client devices are associated with a single user on the content delivery system.

26. The method of claim 1, further comprising providing content requests comprising video or live TV selection requests from the unsupported client device to the content delivery system, and providing the requested video or live TV to the unsupported client device.

27. The method of claim 26, wherein the step of providing the requested video or live TV to the unsupported client device includes conversion between real time streaming protocol (RSTP) to non-RTSP protocol.

28. A content delivery proxy system associated with at least one unsupported client device for delivering content from a content delivery system to the unsupported client device, comprising:
    a client log in module which receives log in messages from the unsupported client device, converts the client log in message into a content delivery system supported format, and sends the converted message to the content delivery system of a content provider;
    an entitlement interface which requests the entitlement rights of a user of the unsupported client device from the content delivery system to determine if the user is an authorized subscriber entitled to access content available from the content delivery system;

a client identifier module which creates an unsupported client identifier associated with the user if the user is found to be a subscriber in the content delivery system of the content provider, the unsupported client identifier associating the unsupported client device with the subscriber to the content delivery system if the user is found to be an authorized subscriber;

a user interface module which displays a user interface for selecting content from the content delivery system on the unsupported client device in a message and display format which is supported by the client device, receives a content request entered at the user interface on the unsupported client device, and sends the content request to the content delivery system; and a display module which displays requested content received from the content delivery system on the client device in a client device display format for playback on the client device.

29. The system of claim 28, wherein the client log in module, user interface module, and display module include at least one translation module which translates between at least two different machine languages.

30. The system of claim 29, further comprising parallel translation modules which translate between multiple different machine languages.

31. The system of claim 29, wherein the machine languages comprise at least two languages selected from the group consisting of JAVA, Hypertext Markup Language (HTML), binary, extended mark up language (XML), Abstract Syntax Notation One (ASN.1), and C/C++.

32. The system of claim 31, wherein the translation modules include modules which convert between different versions of the same language.

33. The system of claim 28, wherein the client log-in module comprises a protocol adapter which adapts messages from the content delivery system into client device supported message format and adapts messages from the unsupported client device to a content delivery system supported format.

34. The system of claim 28, further comprising a plurality of parallel client log-in modules which receive messages from a plurality of unsupported client devices which support different message formats and which are unsupported by the content delivery system, convert received messages in each of the formats of the respective client devices into the content delivery system supported format, and provide converted messages to the content delivery system.

35. The system of claim 34, wherein more than one of the unsupported client devices are associated with a single user of the content delivery system.

36. The system of claim 34, further comprising a plurality of user interface modules which display a user interface for the content provider on each client device, each user interface module displaying the user interface in a format supported by the respective client device on which it is displayed.

37. The system of claim 28, wherein the user interface module comprises an electronic program guide (EPG) module which provides an EPG of content available from the content provider to the unsupported client device in a client device display format for display on the unsupported client device, and which receives content selections made on the EPG by a user of the unsupported client device and provides the content selections to the content delivery system in a content delivery system supported format.

38. The system of claim 28, wherein the content comprises at least one type of content selected from the group consisting of video content, audio content, multi-media content, documents, images, binary data, games, and software.

39. The system of claim 28, wherein the user log in module uses the same provisioning interfaces as the content delivery system.

40. The system of claim 28, wherein the unsupported client device identifier (ID) includes a unique proxy Media Access Control (MAC) address.

41. The system of claim 28, wherein the display module comprises a video on demand (VOD)/live TV signal interface module which provides video or live TV from the content provider to the unsupported client device in a format viewable on the client device.

42. The system of claim 41, wherein the VOD/live TV signal interface module comprises a protocol converter which converts from real time streaming protocol (RTSP) to non-RTSP protocol.

43. A method of delivering content to an unsupported client device within a content delivery system by converting messages and data from the unsupported client device into content delivery system supported messages and data, comprising:

receiving a client log in message from a client device at a content delivery proxy system, the client device comprising an unsupported client device which is not supported by content delivery system of a content provider from which service is requested in the message;

converting the received client log in message into a content delivery system supported message format;

sending the converted message to the content delivery system and requesting the entitlement rights of a user from the content delivery system for the unsupported client device for receiving content from the content provider;

displaying a user interface for selecting content from the content delivery system on the unsupported client device in a message and display format which is supported by the client device;

receiving a content request entered at the user interface on the unsupported client device;

sending the user interface entered content request to content delivery system; and providing the requested content from the content delivery system to the client device in a client device display format for playback on the client device.

44. The method of claim 43, wherein sending the user interface entered content request to content delivery system includes converting the content request into a content request message format supported by the content delivery system.

* * * * *